United States Patent [19]

Sashiki

[11] Patent Number: 4,966,273
[45] Date of Patent: Oct. 30, 1990

[54] DISTRIBUTIVE SUPPLY DEVICE FOR COMBINATORIAL WEIGHING APPARATUS

[75] Inventor: Takashi Sashiki, Nagaokakyo, Japan

[73] Assignee: Kabushiki Kaisha Ishida Koki Seisakusho, Kyoto, Japan

[21] Appl. No.: 462,294

[22] Filed: Dec. 29, 1989

Related U.S. Application Data

[63] Continuation of Ser. No. 279,259, Dec. 1, 1988, abandoned, which is a continuation of Ser. No. 142,249, Jan. 7, 1988, abandoned, which is a continuation of Ser. No. 865,595, May 20, 1986, abandoned, which is a continuation of Ser. No. 771,486, Sep. 3, 1985, abandoned, which is a continuation of Ser. No. 449,576, Dec. 14, 1982, abandoned.

[30] Foreign Application Priority Data

Dec. 25, 1981 [JP] Japan .................. 56-198203

[51] Int. Cl.⁵ .............................. B65G 37/00
[52] U.S. Cl. ..................... 198/601; 198/771; 177/DIG. 11; 177/119
[58] Field of Search ............... 198/504, 505, 601, 609, 198/771; 177/12, 25.11, 119, DIG. 11; 222/199, 200

[56] References Cited

U.S. PATENT DOCUMENTS

| | | | |
|---|---|---|---|
| 2,258,182 | 10/1941 | Howard | 177/DIG. 11 |
| 2,610,726 | 9/1952 | Howard | 222/200 X |
| 2,638,248 | 5/1953 | Alvord | 198/505 X |
| 2,684,148 | 12/1951 | Adams et al. | 198/505 |
| 2,737,289 | 3/1956 | Peters | 198/570 |
| 2,792,030 | 5/1957 | Wahl | 222/200 X |
| 2,819,788 | 1/1958 | Howard | 198/609 |
| 3,300,098 | 1/1967 | Quester et al. | 222/200 X |
| 3,399,771 | 9/1968 | Hryniowski | 222/199 X |

FOREIGN PATENT DOCUMENTS

| | | |
|---|---|---|
| 919038 | 10/1954 | Fed. Rep. of Germany . |
| 776699 | 6/1957 | United Kingdom . |
| 1280112 | 6/1969 | United Kingdom . |
| 2074329 | 10/1981 | United Kingdom . |

OTHER PUBLICATIONS

European Search Report completed Apr. 5, 1983 The Hague.

Primary Examiner—Joseph E. Valenza
Assistant Examiner—Cheryl L. Gastineau
Attorney, Agent, or Firm—Staas & Halsey

[57] ABSTRACT

There is disclosed a precision distributive supply device for use in a combinatorial weighing apparatus. The distributive supply device includes tubular chutes disposed at article discharging portions of an article supply container and having lower ends spaced a suitable distance from the bottom plates of supply troughs.

4 Claims, 2 Drawing Sheets

DISTRIBUTIVE SUPPLY DEVICE FOR COMBINATORIAL WEIGHING APPARATUS

This is a continuation of copending application Ser. No. 07/279,259 filed on Dec. 1, 1988, now abandoned, which is a continuation of Ser. No. 142,249 filed Jan. 7, 1988, which is a continuation of Ser. No. 865,595 filed May 20, 1986, which is a continuation of Ser. No. 771,486 filed Sept. 3, 1985, now abandoned, which is a continuation of Ser. No. 449,576 filed Dec. 14, 1982, now abandoned.

BACKGROUND OF THE INVENTION

The present invention relates to a distributive supply device for a combinatorial weighing apparatus, more particularly, the present invention relates to a distributive supply device suitable for particular use in an automatic combinatorial weighing apparatus in which a plurality of weighing machines weigh batches of articles to produce a plurality of weight values which are added in various combinations, and one of such combinations which is equal or closest to a preset weight is determined in order to combine and discharge those batches of articles which give such a determined combination.

Conventional distributive supply devices for use in combinatorial weighing apparatus include those employing a distributive bowl and those using radial troughs. A weighing apparatus with a distributive bowl or radial troughs is effective enough to perform the function of combining weights or numbers of articles that widely differ with respect to size and shape. However, the conventional weighing device has a tendency to fail to provide correct weight combinations for relatively tiny or minute articles such as dried tea leaves, grain, cornflakes, or the like. More specifically, with the distributive bowl construction, articles are liable to drop through gaps between the discharge ports of guide tracks and shutters disposed at the discharge ports, with the result that the articles will be supplied in an excessive quantity. On the other hand, articles supplied down the distributive troughs continue to fall from a distribution table even when an electromagnetic vibratory device is de-energized at an arbitrary position. This causes the articles to be deposited in a thick layer at the starting ends of the radial troughs to the point where the deposited articles will be spilled over the rear end or side walls of the radial troughs. The deposits in the radial troughs vary in quantity and, therefore, the supply of articles becomes unstable. The distributive supply devices of the foregoing known types are, therefore, disadvantageous in that they have a tendency to supply an unstable quantity of articles especially when the articles are small in size. Additional problems with distributive bowls are that they generate noise when the shutter is opened or closed, and articles suffer damage when subjected to circulatory motion on the guide tracks.

SUMMARY OF THE INVENTION

Accordingly, it is an object of the present invention to provide a distributive supply device of high precision, for a combinatorial weighing apparatus, which is capable of preventing relatively minute articles from falling off.

Another object of the present invention is to provide a distributive supply device for a combinatorial weighing apparatus which allows articles to be deposited in radial troughs to a constant height to effect a stable supply of articles from the radial troughs.

Still another object of the present invention is to provide a distributive supply device for a combinatorial weighing apparatus which incorporates a distributive bowl capable of selectively supplying batches of articles without opening and closing shutters and hence with low noise.

Yet another object of the present invention is to provide a distributive supply device for a combinatorial weighing apparatus which does not damage articles to be supplied and weighed.

A still further object of the present invention is to provide a distributive supply device for a combinatorial weighing apparatus which allows the latter to perform a combinatorial weighing function effectively.

According to the present invention, a distributive supply device for supplying articles to be weighed to a plurality of weighing mechanisms of a combinatorial weighing apparatus, comprises a supply container supported on a vibration generator and having discharging end portions for discharging the articles, a plurality of tubular chutes mounted respectively on the discharging end portions for feeding therethrough the articles which have been supplied from the supply container, and a plurality of containers disposed respectively in alignment with the tubular chutes for being supplied with the articles from the tubular chutes.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

For a better understanding of the present invention, certain prior arrangements will be described before describing the present invention, in order to clarify improvements of the present invention over the prior art.

Figure 1A:
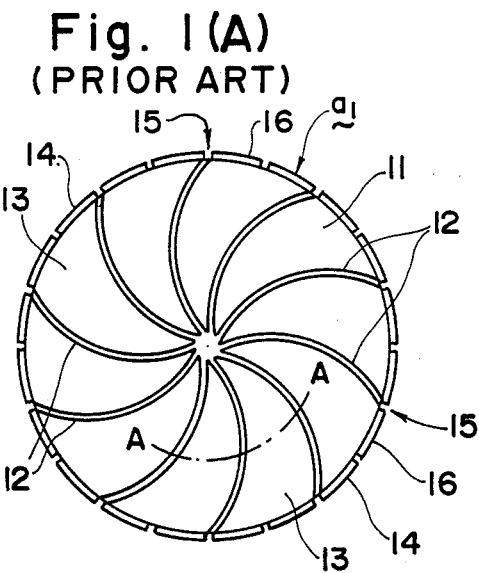
FIG. 1(A) is a plan view of a conventional distributive device incorporating a distributive bowl.
Figure 1B:
FIG. 1(B) is a cross-sectional view taken along line A—A of FIG. 1(A)

FIGS. 1(A) and 1(B) illustrate a conventional distributive supply device $a_1$ incorporating a distributive bowl for use in a combinatorial weighing apparatus. The distributive supply device $a_1$ comprises a circular distributive bowl 11 having a plurality of spiral ridges 12 extending radially outwardly from the center of the bowl toward an outer peripheral edge of the bowl. The ridges 12 define concave regions serving as guide tracks 13 which are substantially arcuate in cross section, as shown in FIG. 1(B) and diverge progressively toward their radially outward discharge ends. An outer wall 14, which is separate from the distributive bowl 11, is located at the discharge ends of the guide tracks 13 and has recesses 15 in which shutters 16 are disposed respectively in the discharge ends of the guide tracks. In operation, a multiplicity of articles are divided and placed onto the guide tracks 13 while the distributive bowl 11 is being vibrated in reciprocable spiral motions which are a combination of reciprocate rotational motions and up-and-down motions. Due to centrifugal forces resulting from such reciprocable spiral motions, the articles in the guide tracks 13 progressively move radially outwardly down the guide tracks 13 toward their discharge ends. At this time, only the shutters 16 at the discharge ends of those guide tracks 13 which give a desired weight or number combination are opened under a command issued from weighing hoppers (not shown) to thereby discharge the articles into a container (not shown). During this time, the articles on the guide tracks 13 with their shutters 16 closed are subjected to circulatory motion in the circumferential direction respectively on the guide tracks 13. The distributive bowl of the known arrangement is effective in sorting out and supplying batches of articles. However, where the articles to be supplied are of relatively fine size such as dried tea leaves, grain or the like, they tend to fall through gaps between the shutters and the guide tracks, with the consequence that an undue quantity of articles need to be supplied and a reliable distributive supply of articles is not achieved. Additional problems with the distributive bowl are that it generates noise when the shutter is opened or closed, and articles suffer from damage due to circulatory motion thereof on the guide tracks.

Figure 2A:
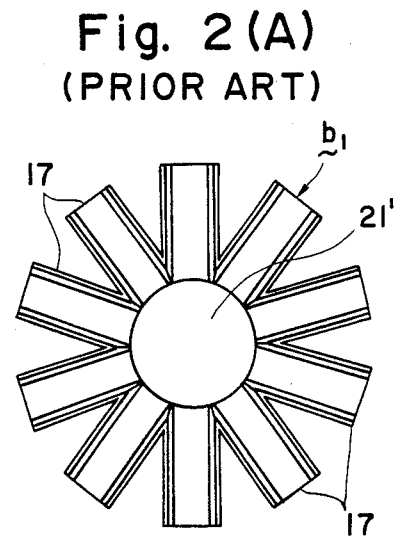
FIG. 2(A) is a plan view of a conventional distributive device having radial troughs.
Figure 2B:
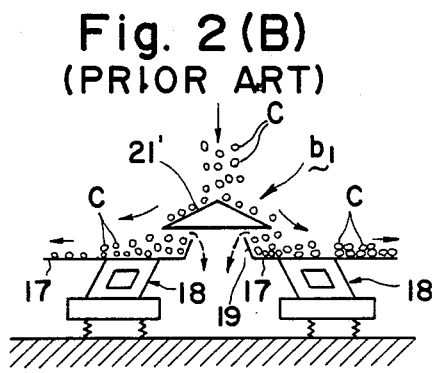
FIG. 2(B) is a front elevational view of the distributive device shown in FIG. 2(B)

FIGS. 2(A) and 2(B) are illustrative of a conventional distributive device $b_1$ having radial troughs for use in a combinatorial weighing apparatus. The distributive device $b_1$ comprises a conical distributive bowl 21' and a plurality of radial troughs 17 extending radially outwardly from the conical distributive bowl 21'. Each of the radial troughs 17 can be vibrated by a corresponding radial feeder 18, as illustrated in FIG. 2(B), to cause articles c to move from the conical distributive bowl 21' progressively down the radial troughs 17 toward their discharge ports. Selective supply of the articles on the radial troughs is effected by turning on and off the radial feeders 18 under a command from weighing hoppers (not shown). Accordingly, the radial troughs are free from shutter noise and article dropping which would be experienced with the distributive bowl, and the articles are not damaged as a result of a long period of time circulatory motion. Conventional radial troughs, however, are disadvantageous in that relatively minute articles tend to fall from the distributive bowl 21' even when a radial feeder 18 is stopped. The articles are then deposited in thick layers at the starting ends of the radial troughs 17 to the point where the deposited articles c will be spilled over the rear end walls 19 or side walls of the radial troughs. The article deposits vary in quantity in each radial trough and are likely to make the supply of articles unstable. The distributive supply devices of the foregoing known types are therefore disadvantageous in that they have a tendency to supply an unstable quantity of articles especially when the articles are small in size.

Figure 3A:
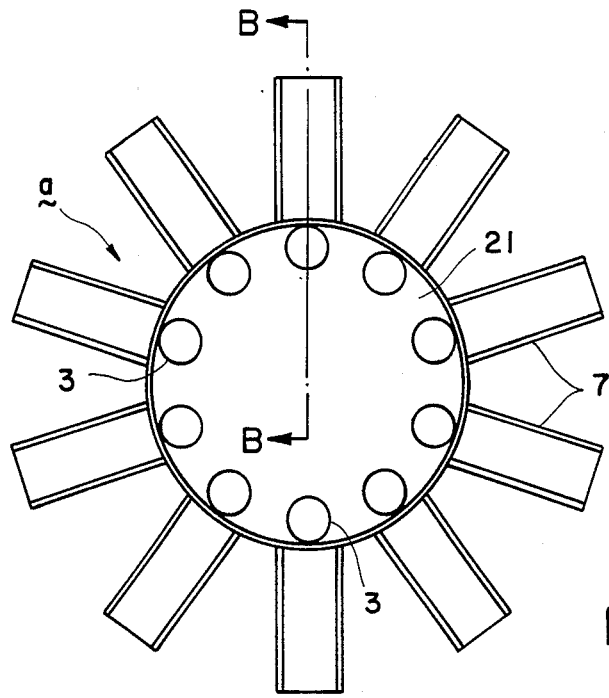
FIG. 3(A) is a plan view of a distributive device according to the present invention, which has radial troughs.
Figure 3B:
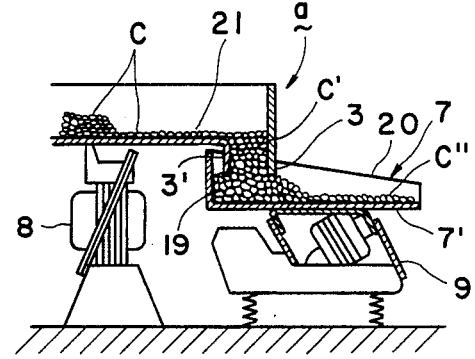
FIG. 3(B) is a cross-sectional view taken along line B—B of FIG. 3(A)

FIGS. 3(A) and 3(B) show a distributive supply device "a" incorporating radial troughs according to the present invention. The distributive supply device "a" comprises in combination a distributive bowl or supply container 21 and radial troughs 7. The distributive bowl 21 is in the form of a circular or substantially circular plate which lies horizontally and has an outer circumferential wall and a plurality of tubular chutes 3 of a small diameter disposed radially inwardly of the outer circumferential wall and projecting downwardly from the circular plate, the tubular chutes 3 having open lower ends 3'. As shown in FIG. 3(B), each radial trough 7 extends radially, with the lower end of one of the tubular chutes 3 of the distributive bowl 21 serving as a supply starting end in the radial trough 7. The radial trough 7 has a rear end wall 19 located radially inwardly of the tubular chute 3 such that the radial trough 7 embraces the tubular chute 3. The tubular chute 3 is therefore surrounded by the rear end wall 19 which is approximately as high as the bottom of the distributive bowl 21, and side walls 20, 20 extending radially outwardly from the rear end wall 19 and having a height progressively reduced, with the lower end 3' of the tubular chute spaced a suitable distance from a bottom plate 7' of the radial trough 7.

The distributive bowl 21 and the radial troughs 7 can be driven respectively by vibration generator 8 and radial feeders 9. The radial feeders 9 vibrate the radial troughs 7. More specifically, the distributive bowl 21 is vibratable in reciprocable spiral motions to enable the articles c to be displaced in circulatory movements from the center of the distributive bowl 21 toward the tubular chutes 3 located at the periphery of the distributive bowl 2. The articles then drop through the tubular chutes 3 toward the rear end portions of the corresponding radial troughs 7. The radial troughs 7 are individually vibrated back and forth to displace the articles progressively from the rear end portions toward the discharge ports. The articles are then supplied to a container such as a pool hopper. Where articles are only to be supplied from particular radial troughs in actual distributive supply operation, only those particular radial troughs are actuated for vibratory article feeding.

Since each tubular chute 3 of the distributive bowl 21 has its lower open end 3' spaced from the bottom plate 7' of the corresponding radial trough 7 and is surrounded by the rear end wall 19 and side walls 20, 20 of the radial trough 7, articles c' supplied from the tubular chute 3 to the radial trough 7 when the radial through 7 is not driven by the radial feeder 9 tend to be deposited in the rear end portion of the radial trough 7. The articles thus deposited close off the lower open end 3' of the tubular chute 3, and the articles are deposited only up to the height which is substantially equal to the height of the lower open end 3'. Accordingly, articles which are additionally supplied are prevented from entering the tubular chute 3, and are kept moving in circulatory paths on the distributive bowl 21. The quantity of articles c"on the radial trough 7 therefore remains unchanged. When the articles on the inactivated radial trough 7 are required, they are supplied stably and correctly without causing noise which would otherwise be produced due to dropping of the articles.

Figure 4:
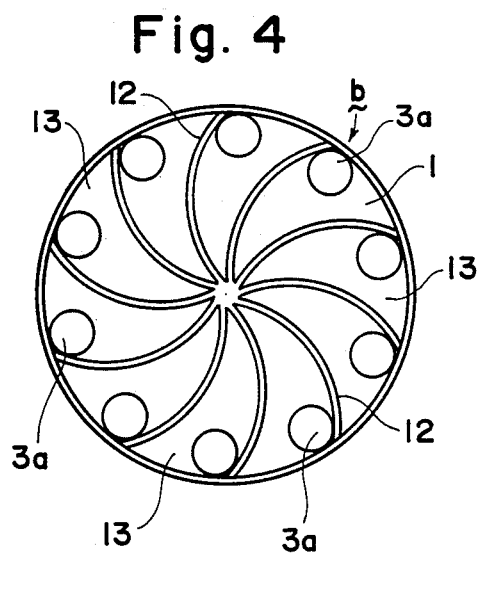
FIG. 4 is a plan view of a distributive device of the invention incorporating a distributive bowl.

FIG. 4 shows a distributive supply device b having a distributive bowl according to another embodiment of the present invention. The distributive supply device b comprises a circular distributive bowl 1 having a plurality of ridges 12 extending spirally from the center of the distributive bowl and defining a plurality of guide tracks 13. The guide tracks 13 have discharge ports and a plurality of tubular chutes ea, of a small diameter are disposed in the discharge chutes. The tubular chutes 3a have lower open ends spaced a suitable distance from a bottom plate of supply troughs (not shown). The flow of articles supplied through the tubular chutes 3a is restricted because the articles become partially jammed, and thus are prevented from being supplied in an excessive quantity. The distributive supply device b can sort out and supply batches of articles without the conventional shutters.

Figure 5:
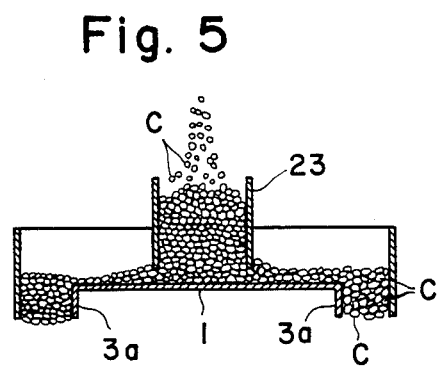
FIG. 5 is a vertical cross-sectional view of a distributive device according to another embodiment, which utilizes a distributive bowl.

According to still another embodiment as shown in FIG. 5, a distributive supply device comprises a distributive bowl 1 and a tubular chute 23 mounted on and located centrally of the distributive bowl 1. The tubular chute 23 has a lower end spaced a suitable distance from a bottom plate of the distributive bowl 1.

Figure 6A:
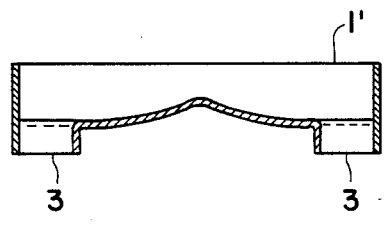
FIGS. 6(A) and 6(B) are vertical cross-sectional views of distributive bowls according to other embodiments of the present invention.

FIG. 6(A) illustrates a distributive supply device according to a still further embodiment. The distributive supply device has a distributive bowl 1' having a raised central portion to provide a downgrade extending from the center of the distributive bowl 1" toward tubular chutes 3 disposed at the peripheral edge portion of the distributive bowl 1'. The downgrade surface allows articles to be displaced easily toward the tubular chutes 3.

Figure 6B:
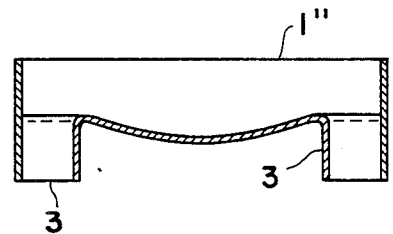

FIG. 6(B) shows another distributive supply device according to still another embodiment. The distributive supply device includes a distributive bowl 1" having a downwardly concave central portion to provide an upgrade extending from the center of the distributive bowl 1" toward tubular chutes 3 at the peripheral margin of the distributive bowl 1". The upgrade surface serves to retard articles as they move toward the tubular chutes 3, so that the articles will be prevented from being supplied excessively but will be fed uniformly in a small quantity.

With the arrangement of the present invention, the distributive supply device for a combinatorial weighing apparatus has tubular chutes disposed at a supply end of a supply container or distributive bowl. The tubular chutes have lower open ends spaced a suitable interval from the bottom plate of a supply trough. This construction causes articles being fed from the distributive bowl to the supply troughs to be jammed in the tubular chutes and hence prevents the articles from being supplied in an excessive quantity, so that the articles can be supplied easily in a controlled quantity and in correctly selected batches which are the most important factor in a combinatorial weighing operation.

In the radial trough: construction, the tubular chutes are located at the periphery of a distributive bowl immediately above the ends of the supply troughs. Articles supplied through the tubular chutes onto the radial troughs are prevented from being spilled over the radial troughs and from changing in the supplied quantity, but can be fed in a desired quantity to a pool hopper or another container.

Although certain preferred embodiments have been shown and described in detail, it should be understood that many changes and modifications may be made therein without departing from the scope of the appended claims.

What I claim is:

1. A distributive supply device for supplying articles to a plurality of weighing mechanisms of a combinatorial weighing apparatus, comprising:
   a first vibration generator;
   a supply container mounted on and vibrated by said vibration generator, having a substantially planar circular distributing plate except for a plurality of ridges formed on a top surface thereof extending spirally from the center to the edges of the plate forming a plurality of article guide paths between the ridges extending from the center of the plate, and a plurality of circumferential openings, one associated with each of the article guide paths;
   a plurality of first tubular chutes, disposed at respective ones of said openings and having an upper end thereof for receiving the articles from said supply container and a lower end;
   a plurality of second vibration generators; and
   a plurality of supply troughs, disposed radially with respect to the supply container, associated with respective ones of said first tubular chutes, and mounted on respective ones of said second vibration generators, each of said supply troughs having a surface spaced a predetermined distance from the lower end of the associated first tubular chute for receiving the articles from the associated first tubular chute, an open end in the radial direction of the supply trough for distributing the articles therefrom, a rear end wall and a pair of side walls extending radially outwardly from the rear end wall so that the associated first tubular chute is surrounded on three sides.

2. A distributive supply device according to claim 1, further comprising a second tubular chute associated with said supply container having a bottom end centrally located at a predetermined distance above the circulate plate through which the articles to be distributed are fed onto the circular plate.

3. A combinatorial weighing apparatus having a plurality of weighing mechanisms and a distributive supply device for supplying articles to be weighed to said weighing mechanisms, comprising:
   a first vibration generator;
   a supply container mounted on said first vibration generator for distributing articles, said container including a substantially circular plate having a solid center portion, an outer circumferential wall having an inner surface mounted on the circumference of the plate and a plurality of openings disposed in said plate along the inner surface of said circumferential wall;
   a plurality of first tubular chutes disposed at respective ones of said openings, each tubular chute having an upper end for receiving articles from said supply container and a lower end;
   a plurality of second vibration generators; and
   a plurality of supply troughs, disposed radially with respect to said supply container, associated with respective ones of said first tubular chutes, and mounted on respective ones of said second vibration generators, each supply trough having a rear end wall, a pair of side walls extending outwardly from the rear end wall whereby the lower end portion of the associated first tubular chute is partly surrounded by the rear end wall and the side walls at a predetermined distance, an open end, and a bottom plate spaced a predetermined distance from the lower end of the associated first tubular chute.

4. A combinatorial weighing apparatus according to claim 3, wherein said distributive supply device further comprises a second tubular chute associated with said supply container and having a bottom end centrally located at a predetermined distance above the plate through which articles to be distributed are fed onto the plate.

* * * * *

UNITED STATES PATENT AND TRADEMARK OFFICE
CERTIFICATE OF CORRECTION

PATENT NO. : 4,966,273

DATED : October 30, 1990

INVENTOR(S) : Takashi Sashiki

It is certified that error appears in the above-identified patent and that said Letters Patent is hereby corrected as shown below:

Column 1, line 16, "apparatus, more" should be
--apparatus.  More--.

Column 4, line 39, "bowl 2." should be --bowl 21.--;
line 54, "through" should be --trough--.

Column 5, line 8, "ea," should be --3a,--; and
"diameter" should be --diameter,--;
line 29, " 1" " should be -- 1' --.

Signed and Sealed this

Seventeenth Day of March, 1992

Attest:

HARRY F. MANBECK, JR.

*Attesting Officer*　　　　　　　*Commissioner of Patents and Trademarks*